United States Patent
Ohashi

(10) Patent No.: US 11,030,732 B2
(45) Date of Patent: Jun. 8, 2021

(54) INFORMATION PROCESSING DEVICE, INFORMATION PROCESSING SYSTEM, AND IMAGE PROCESSING METHOD FOR GENERATING A SUM PICTURE BY ADDING PIXEL VALUES OF MULTIPLE PICTURES

(71) Applicant: SONY INTERACTIVE ENTERTAINMENT INC., Tokyo (JP)

(72) Inventor: Yoshinori Ohashi, Tokyo (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 95 days.

(21) Appl. No.: 16/494,208

(22) PCT Filed: Apr. 14, 2017

(86) PCT No.: PCT/JP2017/015249
§ 371 (c)(1),
(2) Date: Sep. 13, 2019

(87) PCT Pub. No.: WO2018/189880
PCT Pub. Date: Oct. 18, 2018

(65) Prior Publication Data
US 2020/0118258 A1  Apr. 16, 2020

(51) Int. Cl.
*G06K 9/46* (2006.01)
*G06T 5/50* (2006.01)
(Continued)

(52) U.S. Cl.
CPC .............. *G06T 5/50* (2013.01); *G02B 27/017* (2013.01); *G06T 7/593* (2017.01);
(Continued)

(58) Field of Classification Search
CPC . G06T 5/50; G06T 7/593; G06T 2207/10016; G06T 2207/10028; G06T 2207/20221; G02B 27/017
See application file for complete search history.

(56) References Cited

U.S. PATENT DOCUMENTS 9,594,980 B1 *  3/2017  Graham ............... G06Q 10/087
9,767,360 B2 *  9/2017  Cho .................... G06K 9/00624
(Continued)

FOREIGN PATENT DOCUMENTS

EP  0999518 A1 *  5/2000  ........... G06K 9/6857
EP  0999518 A1     5/2000
(Continued)

OTHER PUBLICATIONS

Scene Completion Using Millions of Photographs, James hayes et al., ACM Transactions on Graphics, vol. 26, No. 3, Article 4, Publication date: Jul. 2007., pp. 4-1 to 4-7 (Year: 2007).*

(Continued)

*Primary Examiner* — Jayesh A Patel
(74) *Attorney, Agent, or Firm* — Katten Muchin Rosenman LLP

(57) ABSTRACT

A picture data acquisition unit 52 of an information processing device 10 acquires data of frames of a moving picture from an imaging device 12. A picture data storage unit 54 stores data of at least a predetermined number of past frames. A picture adding unit 56 generates a sum picture obtained by adding pictures of the past frame and a current frame together on a pixel value by pixel value basis. An image analysis unit 58 extracts feature points and acquire position information from each of the sum pictures and the pictures of the current frame, and integrates the acquired pieces of position information. An information processing unit 60 performs information processing using the position (Continued)

information, and an output unit 62 outputs a result of the information processing to a display device 16.

11 Claims, 10 Drawing Sheets

(51) Int. Cl.
*G06T 7/593* (2017.01)
*G02B 27/01* (2006.01)

(52) U.S. Cl.
CPC .......... *G06T 2207/10016* (2013.01); *G06T 2207/10028* (2013.01); *G06T 2207/20221* (2013.01)

(56) References Cited

U.S. PATENT DOCUMENTS

| | | | |
|---|---|---|---|
| 10,775,804 B1* | 9/2020 | Eade | G05D 1/0088 |
| 2004/0218828 A1 | 11/2004 | Aiso | |
| 2005/0036660 A1 | 2/2005 | Otsuka et al. | |
| 2013/0300883 A1* | 11/2013 | Mistretta | G06T 5/20 |
| | | | 348/208.4 |
| 2014/0243614 A1* | 8/2014 | Rothberg | A61B 5/01 |
| | | | 600/301 |
| 2016/0006936 A1* | 1/2016 | Hattori | H04N 5/21 |
| | | | 382/166 |
| 2016/0086350 A1* | 3/2016 | Michel | G06T 7/285 |
| | | | 382/103 |
| 2016/0362050 A1* | 12/2016 | Lee | B60R 1/00 |
| 2017/0017855 A1* | 1/2017 | Karsh | G06K 9/00711 |
| 2017/0234976 A1* | 8/2017 | Grauer | G01S 17/89 |
| | | | 356/5.04 |
| 2018/0144486 A1* | 5/2018 | Yamamoto | G06T 7/174 |
| 2018/0197307 A1* | 7/2018 | Tomioka | G06K 9/00664 |
| 2018/0252922 A1* | 9/2018 | Fujimaki | A63F 13/212 |

FOREIGN PATENT DOCUMENTS

| | | | | |
|---|---|---|---|---|
| JP | 2001357396 A | * | 12/2000 | |
| JP | 2001-357396 A | | 12/2001 | |
| JP | 2003-141523 A | | 5/2003 | |
| JP | 2004-229004 A | | 8/2004 | |
| JP | 2004229004 A | * | 8/2004 | ............ G06T 5/003 |
| JP | 2005-92857 A | | 4/2005 | |

OTHER PUBLICATIONS

International Preliminary Report on Patentability dated Oct. 24, 2019, from International Application No. PCT/JP2017/015249, 13 sheets.

International Search Report and Written Opinion dated Jul. 11, 2017, from International Application No. PCT/JP2017/015249, 9 sheets.

* cited by examiner

F I G . 1
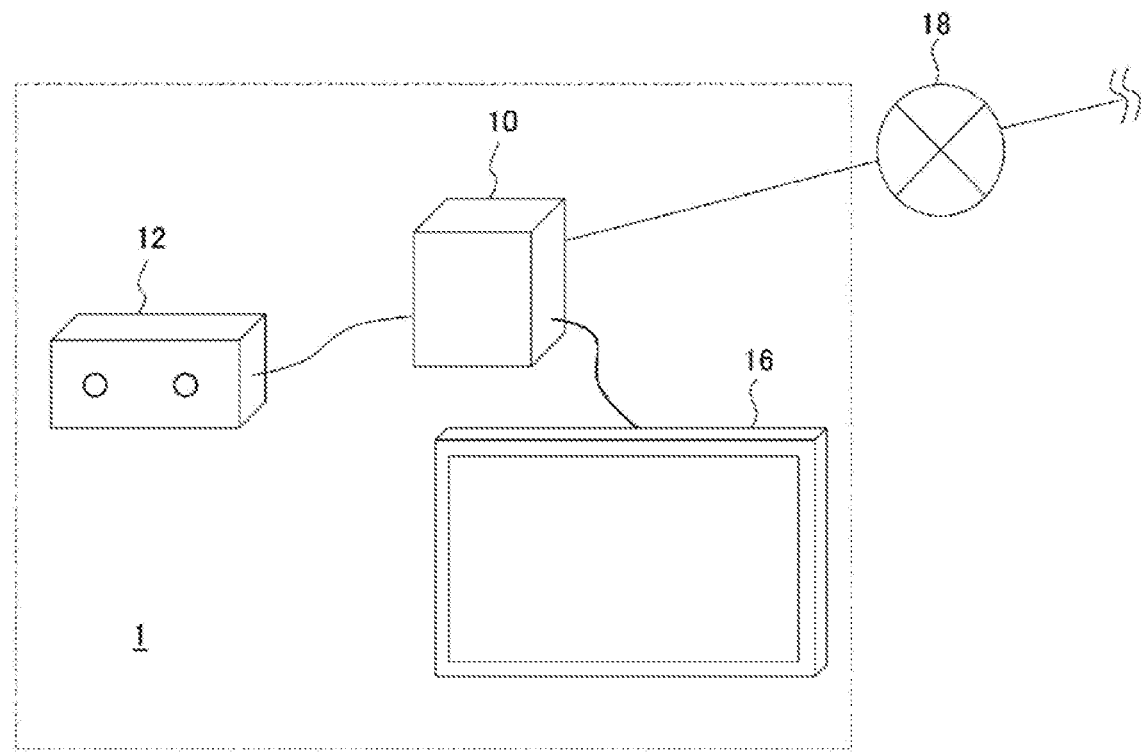
F I G . 2
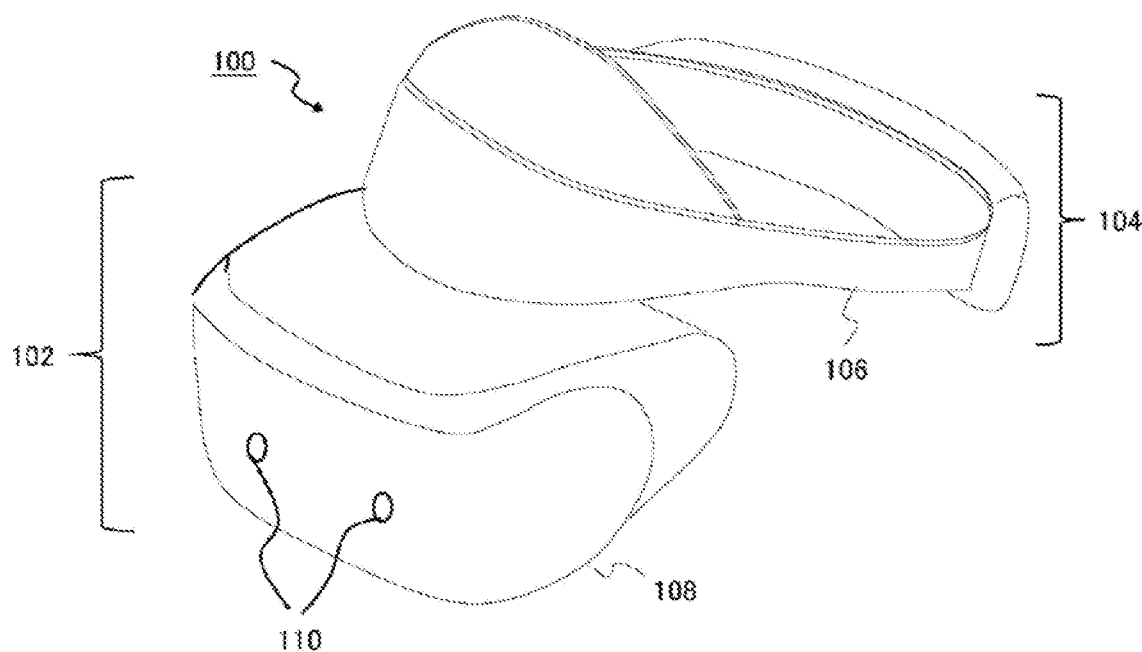

INFORMATION PROCESSING DEVICE, INFORMATION PROCESSING SYSTEM, AND IMAGE PROCESSING METHOD FOR GENERATING A SUM PICTURE BY ADDING PIXEL VALUES OF MULTIPLE PICTURES

TECHNICAL FIELD

The present invention relates to an information processing device that performs a process using a picture obtained by photographing, and an image processing method employed by the device.

BACKGROUND ART

A game is known in which a part of a body of a user, such as a head, is photographed by a video camera, a predetermined area, such as that of an eye, a mouth, or a hand, is extracted, and this area is replaced with another image to be displayed on a display (see, for example, PTL 1). In addition, a user interface system is also known in which a movement of a mouth or a hand photographed by a video camera is accepted as an operation instruction for an application. Thus, a technology of photographing a real world and displaying a virtual world reacting to a movement therein or performing some information processing is widely used in a wide variety of fields, which vary in scale, from compact portable terminals to leisure facilities.

As a technique for identifying information about a condition of a real object using photographed pictures, a stereo image method is known. In the stereo image method, a stereo camera, which photographs the same space from different, left and right, points of view, is introduced, and a distance to a subject is acquired on the basis of a parallax between images of the same subject in stereo pictures obtained by the photographing. This technique uses, in some cases, common color pictures obtained by detecting reflections of ambient light, and, in other cases, pictures obtained by detecting reflections of light in a particular wavelength range, such as infrared rays, emitted to a space to be photographed.

Meanwhile, recent years have seen the spread of techniques for achieving improvements in resolution and color gamut, and of techniques for processing signals in which the range of brightness has been expanded, as a result of various developments of technologies for improving picture quality in graphic display, such as in television broadcasting or video distribution. For example, a high dynamic range (HDR) offers an allowable brightness range approximately 100 times as wide as that of a conventional standard dynamic range (SDR), and is therefore capable of more realistically representing an object that is perceived to be glaring in a real world.

CITATION LIST

Patent Literature

[PTL 1]
European Published Patent No. EP0999518 A1

SUMMARY

Technical Problems

The brightness range of photographed pictures can vary widely depending on a combination of conditions of a space to be photographed, such as the position of a subject, the number of subjects, the color of a subject, the figure of a subject, and the state of light, and settings of an imaging device, such as photographing conditions and image correction parameters. Accordingly, when photographed pictures are used to obtain information about a subject or generate a display picture, the aforementioned uncertain factor may cause a failure to achieve required accuracy or to enjoy full performance of a display device.

The present invention has been made in view of such a problem, and an object thereof is to provide a technique for acquiring information about a real object with stable accuracy using photographed pictures. Another object of the present invention is to provide a technique for achieving image representation with an appropriate brightness range using photographed pictures.

Solution to Problems

One embodiment of the present invention relates to an information processing device. This information processing device includes: a picture data acquisition unit configured to sequentially acquire picture data of frames of a moving picture obtained by photographing; a picture adding unit configured to generate a sum picture obtained by adding, to pixel values of a picture of a current frame newly acquired, pixel values of a picture of a past frame acquired earlier, the pixel values added together being those of pixels at corresponding positions; and an output unit configured to output data representing a result of a predetermined process performed using the sum picture.

Here, the wording "pictures of frames" may refer to either pictures of frames that form a moving picture taken periodically by a single camera, or pictures of frames that form a moving picture taken periodically and simultaneously by a plurality of cameras. In addition, the "predetermined process" performed using the sum picture may be any of common processes for performing some output using photographed pictures. Examples of such processes include a process of modifying a photographed picture into a picture used for display, and various types of image analyses, such as acquisition of a position and a posture, object recognition, motion detection, and visual tracking analysis, which involve a process of detecting feature points from photographed pictures.

Another embodiment of the present invention relates to an information processing system. This information processing system includes: a head-mounted display including an imaging device configured to take a moving picture with a field of view corresponding to a gaze of a user; and an information processing device configured to generate data of display pictures to be displayed by the head-mounted display on a basis of the moving picture. The information processing device includes: a picture data acquisition unit configured to sequentially acquire picture data of frames of the taken moving picture; a picture adding unit configured to generate a sum picture obtained by adding, to pixel values of a picture of a current frame newly acquired, pixel values of a picture of a frame acquired earlier, the pixel values added together being those of pixels at corresponding positions; and an output unit configured to output the data of the display pictures, the data representing a result of a predetermined process performed using the sum picture.

A yet another embodiment of the present invention relates to an image processing method. This image processing method includes: a step of sequentially acquiring picture data of frames of a moving picture obtained by photographing, and storing the picture data in a memory; a step of generating a sum picture obtained by adding, to pixel values of a picture of a current frame newly acquired, pixel values of a picture of a past frame acquired earlier and read from the memory, the pixel values added together being those of pixels at corresponding positions; and a step of outputting data representing a result of a predetermined process performed using the sum picture.

Note that any combinations of constituent elements described above, and a method, a device, a system, a computer program, a recording medium storing a computer program, and so on which have features of the present invention, are also effective as embodiments of the present invention.

Advantageous Effects of Invention

The present invention makes it possible to obtain appropriate results with stability in acquisition of position information of a real object or picture display using photographed pictures.

BRIEF DESCRIPTION OF DRAWINGS

FIG. 1 is a diagram illustrating an exemplary configuration of an information processing system according to a first embodiment.

FIG. 2 is a diagram illustrating outer appearance of a head-mounted display, which is an example of a display device according to the first embodiment.

DESCRIPTION OF EMBODIMENTS

First Embodiment

Figure 3:
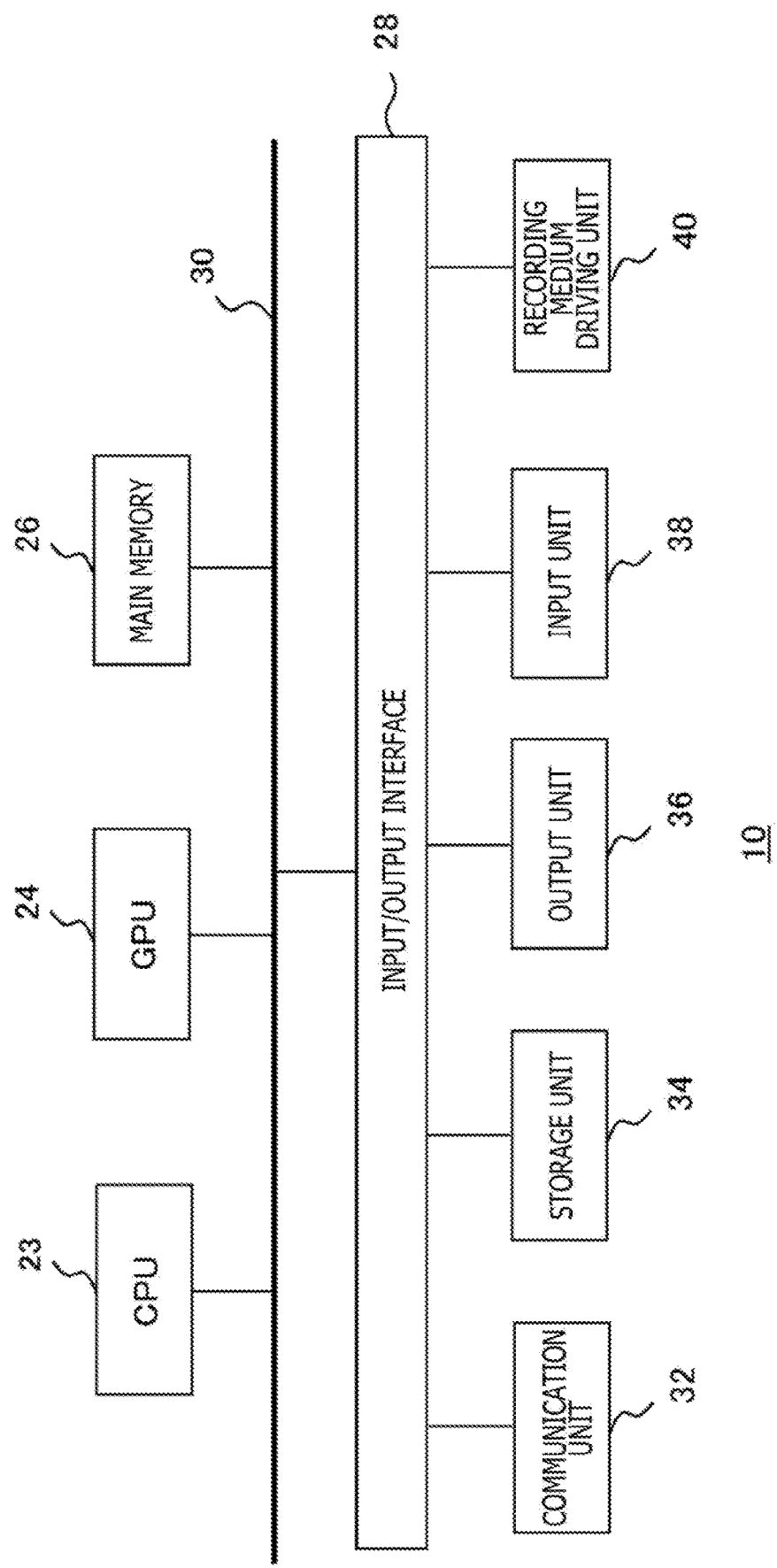
FIG. 3 is a diagram illustrating an internal circuit configuration of an information processing device according to the first embodiment.

The present embodiment relates to a technique for acquiring position information of a subject from a photographed picture. In such a technique, a feature point is often detected from the photographed picture. However, feature points appear in various manners on a picture depending on conditions in a real space, such as the brightness of a space to be photographed, the actual position of a subject, or the like. In particular, it may happen that, in an area with a low brightness, a feature point cannot be detected, making the position information undefined or highly erroneous.

In the present embodiment, the brightness range is controlled by adding photographed pictures of a plurality of frames together so that an improvement in precision of detection of feature points can be achieved. In the following description, a focus is placed on a technique for acquiring the position information of a subject using stereo pictures taken of the same space from left and right points of view. Note, however, that the present embodiment is similarly applicable to pictures other than the stereo pictures as long as a process of detecting feature points from photographed pictures is involved. Also note that the purpose of detecting the feature points may not necessarily be to acquire the position information of the subject, but may alternatively be any of various types of image analyses, including face detection, facial recognition, object detection, and visual tracking.

FIG. 1 illustrates an exemplary configuration of an information processing system according to the present embodiment. The information processing system 1 includes an imaging device 12 that photographs a real space, an information processing device 10 that performs information processing on the basis of photographed pictures, and a display device 16 that displays a picture outputted by the information processing device 10. The information processing device 10 may be arranged to be connectable to a network 18, such as the Internet.

The information processing device 10, the imaging device 12, the display device 16, and the network 18 may be connected to one another via a cable in a wired manner, or may alternatively be connected to one another in a wireless manner via a wireless local area network (LAN) or the like. Two or all of the imaging device 12, the information processing device 10, and the display device 16 may be combined to form an integrated device. For example, the information processing system 1 may be implemented by a portable terminal, a head-mounted display, or the like that is equipped therewith. In any case, the outer appearances of the imaging device 12, the information processing device 10, and the display device 16 are not limited to those illustrated in the figure. Also, note that the display device 16 may be eliminated in the case where the information processing does not require picture display.

The imaging device 12 includes a pair of cameras that photograph, with a predetermined frame rate, a space to be photographed from left and right positions a known distance apart from each other. A pair of pictures taken by the imaging device 12 from the left and right points of view, i.e., data of stereo pictures, are sequentially transmitted to the information processing device 10. The information processing device 10 analyzes the stereo pictures, and thereby acquires position information of a subject in a three-dimensional real space, including a distance thereof from an imaging surface. A technique for acquiring the position information of a subject from stereo pictures is already known.

Specifically, corresponding points that represent an image of the same subject are obtained from a pair of pictures, and a distance from a camera to the subject is calculated by the principles of triangulation with a difference in position between the corresponding points as a parallax. The position coordinates of the subject in a three-dimensional space are obtained from the above distance and the position of the image on picture planes. For example, the information processing device 10 generates, as the position information, a depth image representing the distance to the subject obtained by the analysis in the form of a pixel value of the image on the picture plane.

For such a purpose, types of pictures taken by the imaging device 12 are not limited. For example, the imaging device 12 may take a color picture of visible light with a camera having a common image pickup device, such as a complementary metal oxide semiconductor (CMOS) sensor. Alternatively, the imaging device 12 may detect light in a particular wavelength range, such as infrared rays, and take a picture representing an intensity distribution of the light.

In this case, the imaging device 12 may be equipped with a mechanism to emit, to the space to be photographed, the light in the wavelength range to be detected. A technique of emitting light in a spot, slit, or patterned form and photographing reflected light thereof to obtain the distance to a subject is known as an active stereo technique. The active stereo technique is distinguished from a so-called passive stereo technique, in which a distance is obtained from color stereo pictures taken with ambient light, in that corresponding points on pictures can be easily extracted even in the case of a subject being poor in feature points.

Note that, in the case where invisible light is used to obtain the position information, the imaging device 12 may be equipped with a separate camera that takes common color pictures, and the separate camera may be used for another purpose, such as to generate a display picture. Hereinafter, the term "picture" will be used as a general term for two-dimensional data representing the brightness of light detected by the imaging device 12, regardless of the wavelength range of the light detected. The information processing device 10 acquires the position information of the subject as mentioned above at a predetermined rate using the data of the pictures transmitted from the imaging device 12, and performs the information processing as appropriate on the basis thereof to generate output data.

Here, the content of the output data is not limited to particular contents, and may be any of a variety of contents that match functions that a user demands of the system, an application activated, or the like. For example, the information processing device 10 may add some processing to a photographed picture, or generate a game screen while causing a computerized game to progress, on the basis of the position information of the subject. Typical examples of such modes include virtual reality (VR) and augmented reality (AR).

The display device 16 includes a display that outputs pictures, such as a liquid crystal display, a plasma display, or an organic electroluminescence (EL) display, and a loudspeaker that outputs an audio, and outputs the output data supplied from the information processing device 10 in the form of a picture or an audio. The display device 16 may be a television receiver, any of various types of monitors, a display screen of a portable terminal, or the like, or may be a head-mounted display, which is attached to a head of the user to display a picture in front of eyes of the user.

FIG. 2 illustrates outer appearance of a head-mounted display 100, which is an example of the display device 16. In this example, the head-mounted display 100 includes an output mechanism unit 102 and a wearing mechanism unit 104. The wearing mechanism unit 104 includes a wearing band 106 worn by the user so as to extend around the head to achieve fixing of the device.

The output mechanism unit 102 includes a housing 108 so shaped as to cover the left and right eyes of the user when the head-mounted display 100 is worn by the user, and includes an internal display panel arranged to be opposite to the eyes when the head-mounted display 100 is worn by the user. Inside of the housing 108, a lens may be additionally provided which is positioned between the display panel and the eyes of the user when the head-mounted display 100 is worn by the user to expand the viewing angle of the user. The head-mounted display 100 may further include a loudspeaker or an earphone at a position which will correspond to the position of an ear of the user when the head-mounted display 100 is worn by the user. Further, the head-mounted display 100 may be internally equipped with any of a variety of motion sensors, such as an acceleration sensor, to acquire the position or posture of the head of the user.

In this example, the head-mounted display 100 has, as the imaging device 12, a stereo camera 110 on a front of the housing 108, and a surrounding real space is photographed therewith at a predetermined frame rate with a field of view corresponding to a gaze of the user. The head-mounted display 100 as described above is able to acquire position information and an outward shape of a real object within the field of view of the user. In addition, an introduction of a technique of simultaneous localization and mapping (SLAM) will make it possible to acquire the position and posture of the head of the user on the basis of such information.

Virtual reality, which presents a virtual world spreading in front of the eyes, can be realized by, using such information, determining a field of view for the virtual world, generating display pictures for left-eye vision and right-eye vision, and displaying the display pictures in left and right regions of the head-mounted display. Further, augmented reality can be realized by superimposing a virtual object that interacts with a real object that is a subject upon color pictures taken from the left and right points of view, and displaying the resulting pictures. In the case where color pictures are used for display, and pictures in a particular wavelength range are used for acquiring information about the subject, the head-mounted display 100 may be provided with a plurality of sets of stereo cameras 110, each set being used for a separate wavelength range to be detected.

Note that the information processing device 10 may be an external device that is capable of establishing communication with the head-mounted display 100, or may alternatively be contained in the head-mounted display 100. Thus, the information processing system 1 according to the present embodiment is applicable to a variety of modes, and therefore, the configuration and outer appearance of each device may be appropriately determined in accordance with the mode. In such a mode, a change in the position of the subject or the condition of the space to be photographed will change how an image appears in the photographed picture.

For example, when in a low-brightness environment, even a subject with a surface form having many feature points may not be able to provide a clear image thereof in the photographed picture. Further, in a mode in which light in a particular wavelength range is emitted, and reflected light thereof is observed, reflected light from a subject being far away may not be obtained with sufficient brightness depending on intensity of the emitted light. This might result in a failure to extract corresponding points from the stereo pictures, resulting in a failure to acquire the position information or a low accuracy thereof.

As measures against the above, it is conceivable to adjust image correction parameters or photographing conditions, such as an exposure time and a gain value, or adjust the intensity of the emitted light. However, the position of the subject and how the light appears vary in various manners, and optimum conditions may not be uniquely determined even for the same space to be photographed. For example, in the case where the intensity of the emitted light is adjusted, increasing the intensity for a distant subject may result in too intense reflected light coming from a close subject, resulting in an unclear image thereof. Similarly, in the case of the color pictures, extending the exposure time or increasing the gain value may result in a whitish appearance of an originally bright area in its entirety. In any case, it is difficult to optimize a combination of the photographing conditions, the correction parameters, the emission intensity, and so on every time the situation changes.

Accordingly, in the present embodiment, with such conditions being fixed, a picture of an immediately previous frame is added to a photographed picture obtained to amplify the range of pixel values. Specifically, if the imaging device performs video shooting with frames being obtained at intervals of $\Delta t$, pixel values of frames at times $t-\Delta t$, $t-2\Delta t$, ..., $t-N\Delta t$ are added to pixel values of a current frame at time $t$, with the pixel values added together being those of pixels at corresponding positions. Here, N is a natural number representing the number of past frames to be added. When N=3, for example, pictures of four frames, including the current frame, are added together.

In this case, the pixel values of a picture resulting from the addition will be about N+1 times those of the original picture. As a result, the brightness is amplified, facilitating detection, at a portion at which a significant difference should be observed from surrounding pixels, such as a feature point or a position at which the emitted light is reflected. Further, the addition of the pictures of other frames levels noise, resulting in an increase in SN ratio. As a result, even when there is a large distance to a subject, or when the intensity of the light is low, a picture with a sufficient brightness for analysis can be obtained, and accurate position information about the subject can be acquired.

Thus, the need to increase the exposure time or the gain value or increase the intensity of the emitted light is eliminated because a sufficient brightness can be ensured even for an image of a subject with a low intensity of reflected light. That is, an analysis can be accomplished with high precision without the need for an increase in the intensity of the light on the photographing side. Meanwhile, in the case where there is a subject for which a sufficient brightness is originally obtained, an addition of a past frame is not necessary for that subject. Accordingly, a processing channel along which the addition of the past frame is performed to acquire the position information, and a processing channel along which only the current frame is used to acquire the position information without the addition of the past frame, may be provided to make it possible to acquire accurate position information about every subject regardless of the condition in which the subject is placed. Further, three or more amplification rates of the brightness may be prepared by preparing two or more numbers of past frames to be added.

FIG. 3 illustrates an internal circuit configuration of the information processing device 10. The information processing device 10 includes a central processing unit (CPU) 23, a graphics processing unit (GPU) 24, and a main memory 26. These components are connected to each other via a bus 30. Further, an input/output interface 28 is connected to the bus 30. To the input/output interface 28 are connected: a communication unit 32, which is formed by a peripheral device interface, such as a USB or IEEE 1394 interface, or a wired or wireless LAN network interface; a storage unit 34, such as a hard disk drive or a non-volatile memory; an output unit 36 that outputs data to the display device 16; an input unit 38 that accepts input of data from the imaging device 12 or an input device (not depicted); and a recording medium driving unit 40 that drives a removable recording medium, such as a magnetic disk, an optical disk, or a semiconductor memory.

The CPU 23 controls the whole of the information processing device 10 by executing an operating system stored in the storage unit 34. The CPU 23 also executes various types of programs, which may be read from the removable recording medium and loaded into the main memory 26, or be downloaded via the communication unit 32. The GPU 24 has a function of a geometry engine and a function of a rendering processor, performs a rendering process in accordance with a rendering instruction from the CPU 23, and outputs a result to the output unit 36. The main memory 26 is formed by a random-access memory (RAM), and stores data and a program required for processing.

Figure 4:
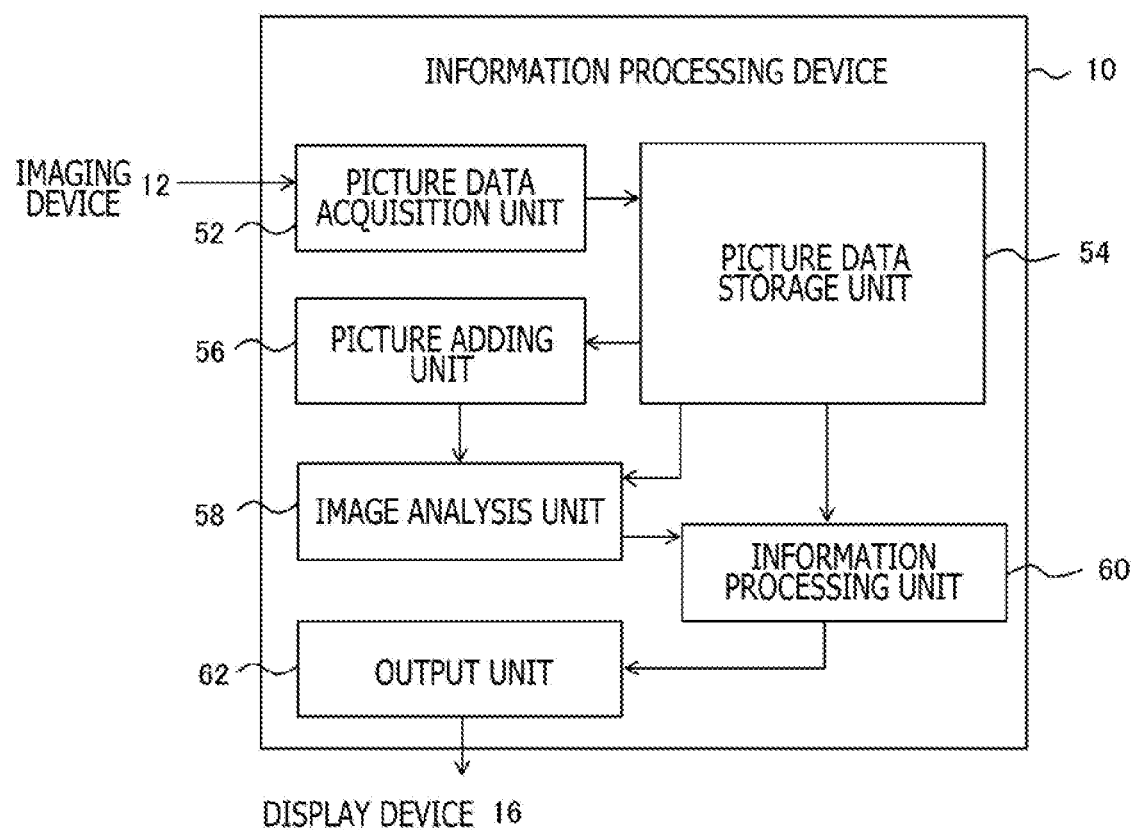
FIG. 4 is a diagram illustrating a configuration of functional blocks of the information processing device according to the first embodiment.

FIG. 4 illustrates a configuration of functional blocks of the information processing device 10. The functional blocks of the devices illustrated in FIG. 4 and FIG. 9, which will be described below, can be implemented in hardware by various circuits as illustrated in FIG. 3, and can be implemented in software by a program which is loaded from a recording medium to the main memory to execute a relevant function, such as an image analysis function, an information processing function, an image rendering function, or a data input/output function. Accordingly, it should be understood by those skilled in the art that such functional blocks can be implemented in various forms only in hardware, only in software, or in a combination thereof, and the form of implementation is not limited to any of the above.

The information processing device 10 includes a picture data acquisition unit 52 that acquires data of pictures from the imaging device 12, a picture data storage unit 54 that stores the acquired data of the pictures, a picture adding unit 56 that performs an addition of pictures of a predetermined number of past frames, an image analysis unit 58 that analyzes the pictures to obtain the position information of a subject, an information processing unit 60 that performs information processing using an analysis result, such as the position information, and an output unit 62 that outputs data to be outputted.

The picture data acquisition unit 52 is implemented by the input unit 38, the CPU 23, the main memory 26, and so on illustrated in FIG. 3, and sequentially acquires the data of the pictures, which are taken by the imaging device 12 at the predetermined frame rate. The data includes data of pictures from which feature points are to be detected, such as color stereo pictures obtained with visible light, stereo pictures obtained with reflected light resulting from emitting light in a particular wavelength range, such as infrared rays, and/or the like. The picture data acquisition unit 52 causes the data of the pictures sent at the predetermined frame rate to be sequentially stored in the picture data storage unit 54. Picture data of at least the current frame and a predetermined number of past frames are stored in the picture data storage unit 54.

The picture adding unit 56 is implemented by the CPU 23, the GPU 24, the main memory 26, and so on illustrated in FIG. 3, and reads the picture data of the current frame stored in the picture data storage unit 54, and the picture data of the predetermined number of past frames stored immediately previously. Then, the picture adding unit 56 generates a sum picture for each of the left and right points of view of the stereo pictures, the sum picture being obtained by adding the pixel values of pixels at corresponding positions together. Here, as mentioned above, a plurality of pairs of sum pictures, each pair having a different number of frames added together, may be generated. The frequency with which the sum pictures are generated is determined on the basis of a time resolution demanded of the position information, and may be either equal to or smaller than the frame rate at which the pictures are taken by the imaging device 12.

The image analysis unit 58 is implemented by the CPU 23, the GPU 24, the main memory 26, and so on illustrated in FIG. 3, and, every time the picture adding unit 56 has generated stereo pictures of the sum pictures, identifies corresponding points therein, and obtains a distance to a subject with the principles of triangulation on the basis of a parallax thereof. In parallel therewith, the image analysis unit 58 identifies corresponding points in stereo pictures of the current frame, which are obtained before the addition, and obtains a distance to the subject on the basis thereof as well. Then, the image analysis unit 58 integrates the results of the both, and generates, with a predetermined frequency, final position information, which provides even accuracy regardless of the condition of the subject.

The information processing unit 60 is implemented by the CPU 23, the main memory 26, and so on illustrated in FIG. 3, and sequentially acquires the position information generated by the image analysis unit 58, and performs predetermined information processing using the acquired position information. As mentioned above, the content of the information processing performed here is not limited to particular contents. As a result of this information processing, the information processing unit 60 generates, with a predetermined frequency, output data, such as display pictures, audios, and/or the like. At this time, the picture data of the current frame stored in the picture data storage unit 54 may be read therefrom as necessary, and be used to generate the output data. The output unit 62 is formed by the CPU 23, the output unit 36, and so on illustrated in FIG. 3, and sequentially outputs the generated output data to the display device 16 with appropriate timing.

Figure 5:
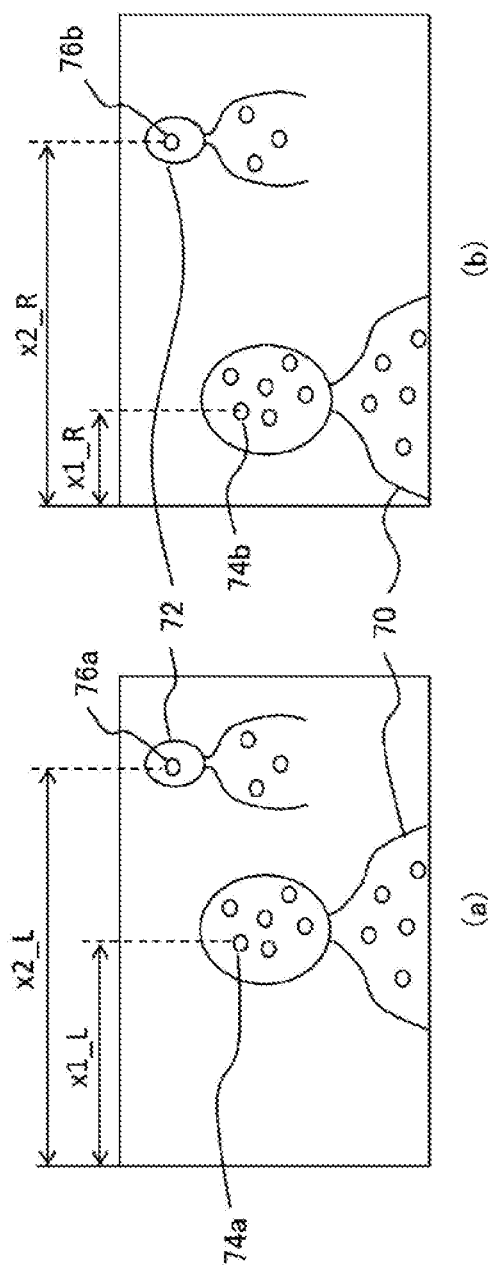
FIG. 5 is a diagram for explaining a technique of emitting infrared rays in a patterned form and acquiring a distance to a subject using photographed pictures obtained with reflected light thereof, according to the first embodiment.

FIG. 5 is a diagram for explaining a technique of emitting infrared rays in a patterned form and acquiring a distance to a subject using photographed pictures obtained with a reflected light thereof, as an example of the present embodiment. Here, (a) and (b) of FIG. 5 schematically represent photographed pictures taken from the left point of view and the right point of view, respectively. In each of the photographed pictures, two persons 70 and 72, who are subjects, are pictured. The person 70 is at a position closer to the imaging device 12 than the person 72. In addition, in the picture taken from the left point of view represented by (a), images of the subjects are pictured more rightward than in the picture taken from the right point of view represented by (b).

If infrared rays in a spot form are emitted to the space to be photographed with a predetermined distribution in this situation, reflected lights from surfaces of the persons 70 and 72 appear in a spot form on the photographed pictures (for example, images 74a, 74b, 76a, 76b). Because a distribution pattern of the emitted infrared rays is known, corresponding points in the pictures taken from the left and right points of view can be obtained on the basis of distribution patterns of the images of the reflected lights in the photographed pictures. For example, it can be seen that the images 74a and 76a in the picture taken from the left point of view and represented by (a) correspond to the images 74b and 76b, respectively, in the picture taken from the right point of view and represented by (b).

Here, suppose that the images 74a and 74b, which correspond to the same reflection on the person 70, have been detected at horizontal positions $x1\_L$ and $x1\_R$, respectively, on the respective pictures. In this case, the parallax is given by $x1\_L-x1\_R$. Similarly, suppose that the images 76a and 76b, which correspond to the same reflection on the person 72, have been detected at horizontal positions $x2\_L$ and $x2\_R$, respectively, on the respective pictures. In this case, the parallax is given by $x2\_L-x2\_R$. Qualitatively, the distance to a subject is inversely proportional to the parallax, and therefore, the distance can be derived on the basis of the parallax if a constant of inverse proportionality has been obtained by calibration in advance.

Since the person 70 is at a closer position than the person 72 in the illustrated example, the parallax of the person 70, $x1\_L-x1\_R$, is greater than the parallax of the person 72, $x2\_L-x2\_R$. If, in such a system, the infrared rays are emitted with such intensity as to provide appropriate brightness of images of reflected lights from the person 70, who is at a position closer to the imaging device 12, e.g., the images 74a and 74b, a sufficient brightness may not be obtained for images of reflected lights from the person 72, e.g., images 76a and 76b, and, the brightness thereof may possibly be indistinguishable from noise. If this happens, the images 76a and 76b cannot be detected from the pictures, making it impossible to obtain the position information of the person 72.

Figure 6:
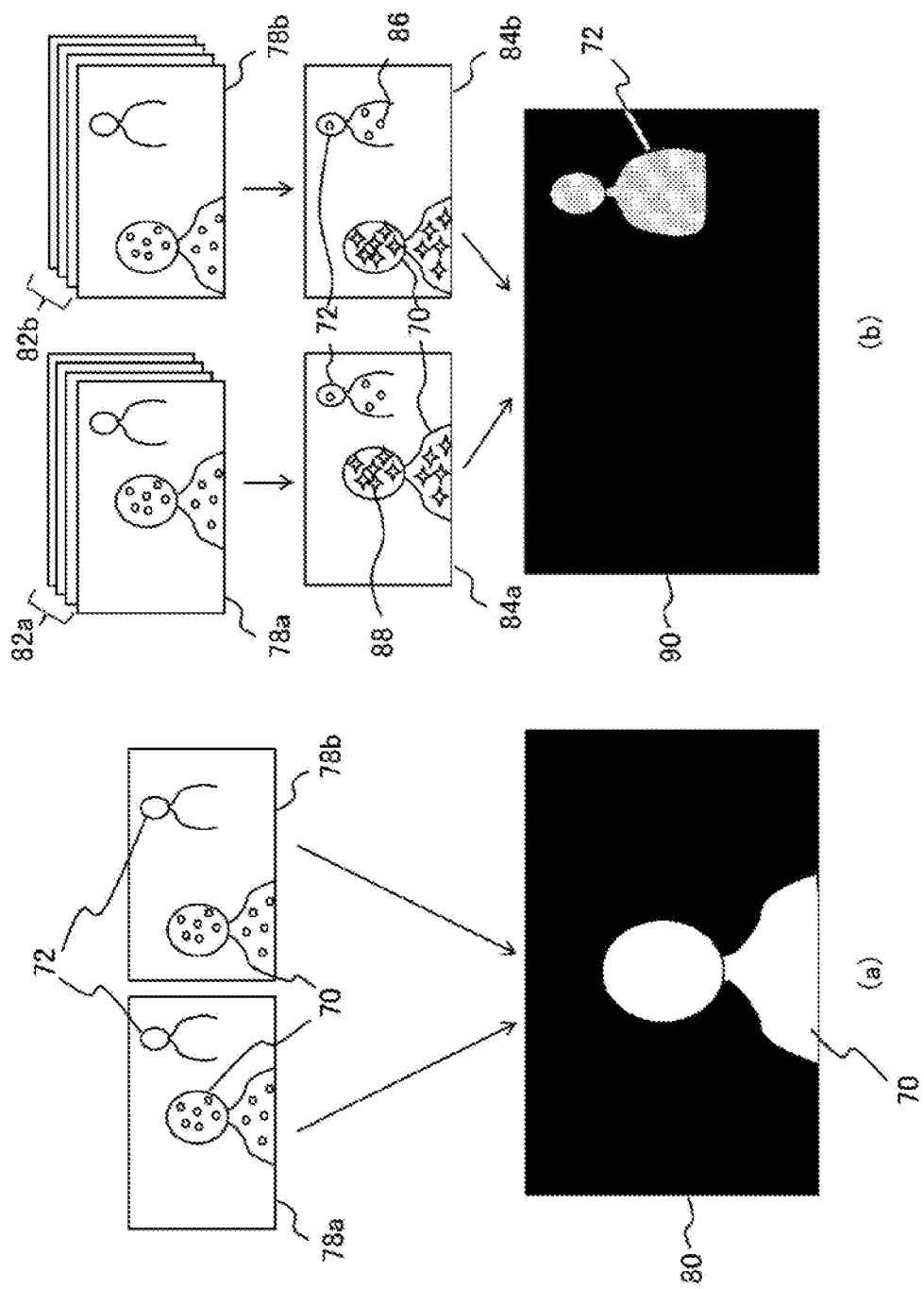
FIG. 6 is a diagram for explaining an advantageous effect achieved by addition of frames according to the first embodiment.

FIG. 6 is a diagram for explaining an advantageous effect achieved by the addition of frames in a situation similar to that of FIG. 5. Here, (a) of FIG. 6 schematically illustrates a processing channel along which only the current frame is used to generate the position information, while (b) of FIG. 6 schematically illustrates a processing channel along which the sum pictures are used to generate the position information. Here, the position information is assumed to be a depth image in which a pixel value represents a distance to a subject, and higher brightness values represent smaller distances. It is not meant, however, that the position information is limited to this example. In the processing channel of (a), only stereo pictures 78a and 78b of the current frame are used to detect corresponding points, and a distance to a subject is derived from a parallax thereof.

However, in the case where the intensity of a light reflected from the person 72, who is behind, is so weak that an image of the reflected light does not clearly appear in the picture as it should do as illustrated in the figure, an accurate parallax cannot be obtained therefor, which will result in reduced accuracy of the distance. As a result, in a depth image 80 generated by the position information acquisition unit 58, a distance value of the person 70 in front is given accurately, while a distance value of the person 72 behind may be undefined and may not be given, or a highly erroneous distance value thereof may be given.

In the processing channel of (b), first, the picture adding unit 56 adds, to the stereo pictures 78a and 78b, pictures 82a and 82b, respectively, of three frames immediately previous to the current frame to generate sum stereo pictures 84a and 84b. In each of the sum stereo pictures, brightness values are about four times as high as those in the original picture, and accordingly, an image (e.g., an image 86) of a reflected light from the person 72, which is not clear before the addition, becomes clear. Meanwhile, an image of a reflected light from the person 70, which has a proper brightness in the picture before the addition, may exceed an upper limit of a brightness range permitted for computation as a result of the addition.

In the figure, such images (e.g., an image 88) of reflected lights are represented by stars. As a result, in a depth image 90 generated by the position information acquisition unit 58, a distance value of the person 72 behind is given accurately, while a distance value of the person 70 in front may be undefined and may not be given, or a highly erroneous distance value thereof may be given. Thus, the necessity for the addition and an appropriate number of frames to be added together depend on the position of a subject, the intensity of a light that impinges on the subject, the photographing conditions, such as the exposure time in photographing, the image correction parameters, and so on.

When a plurality of processing channels are provided and independent analyses are performed therein to generate the position information in each of the processing channels as in the illustrated example, highly accurate information will be obtained in at least one of the above, regardless of the condition of the space to be photographed, and without the need to adjust the emission intensity, the photographing conditions, the correction parameters, or the like. Accordingly, the position information acquisition unit 58 extracts pieces of information that are expected to be highly accurate from the pieces of position information, and combines the extracted pieces of information to generate a single, final piece of position information.

Figure 7:
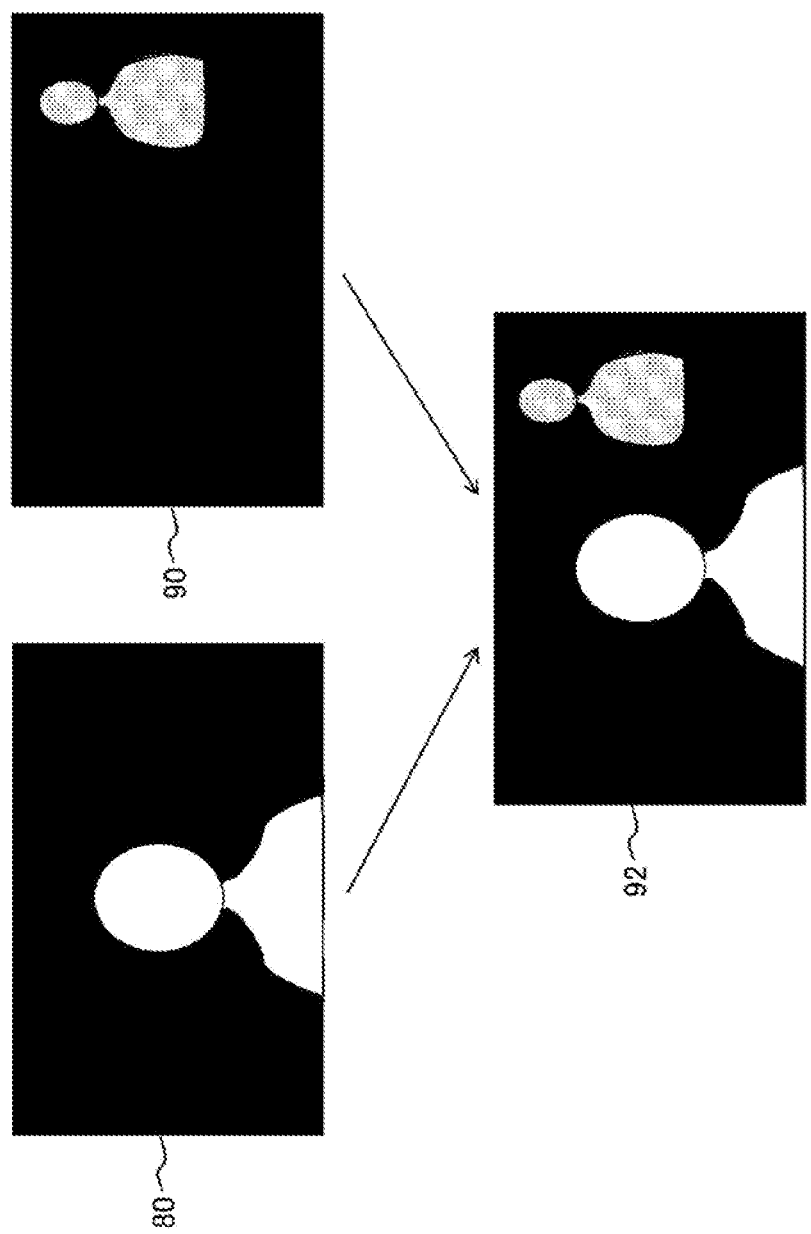
FIG. 7 is a diagram illustrating how a plurality of depth images are integrated according to the first embodiment.

FIG. 7 illustrates how the two depth images 80 and 90 illustrated in FIG. 6 are integrated. In the illustrated example, the subject for which the distance value is given is clearly different between the depth images. In this case, the two depth images are compared with each other, and an area in which the distance value is given in only one of the depth images is extracted, and the pixel value in a corresponding area in the other depth image may be replaced therewith.

For example, the depth image 80, which is used as a basis, is scanned in a raster order, for example, and when a pixel in which an effective value is not stored as a distance value is detected, a corresponding pixel in the other depth image 90 is referred to. If an effective value is stored in the corresponding pixel, the pixel value in the original depth image 80 is updated to this value. By performing this process for every pixel in the depth image 80, a depth image 92 obtained by an integration of the two depth images 80 and 90 can be generated.

Note that the reliability of the distance value may be obtained with respect to each pixel when the original depth images 80 and 90 are generated, and the distance value having a higher reliability may be adopted when the integration is carried out. For example, in a block matching technique in which, for a minute block determined in one of the stereo pictures, a minute block in the other stereo picture is horizontally moved to determine a position that provides the highest degree of similarity to be a corresponding point, the reliability can be determined on the basis of the degree of similarity between the blocks when the corresponding point has been determined. It should be understood by those skilled in the art that the reliability of the distance value can be obtained on various other bases than the above.

FIGS. 6 and 7 illustrate the example in which the depth images are generated from the stereo pictures along a plurality of processing channels. Note, however, that, as mentioned above, the present embodiment is able to achieve a similar advantageous effect as long as a process of detecting feature points is involved, regardless of the information to be outputted. That is, when, with respect to each of a plurality of subjects having different brightness ranges, analysis results are independently obtained along different processing channels, and the analysis results are integrated, an analysis result with secure accuracy can be outputted regardless of the conditions of the subjects.

Figure 8:
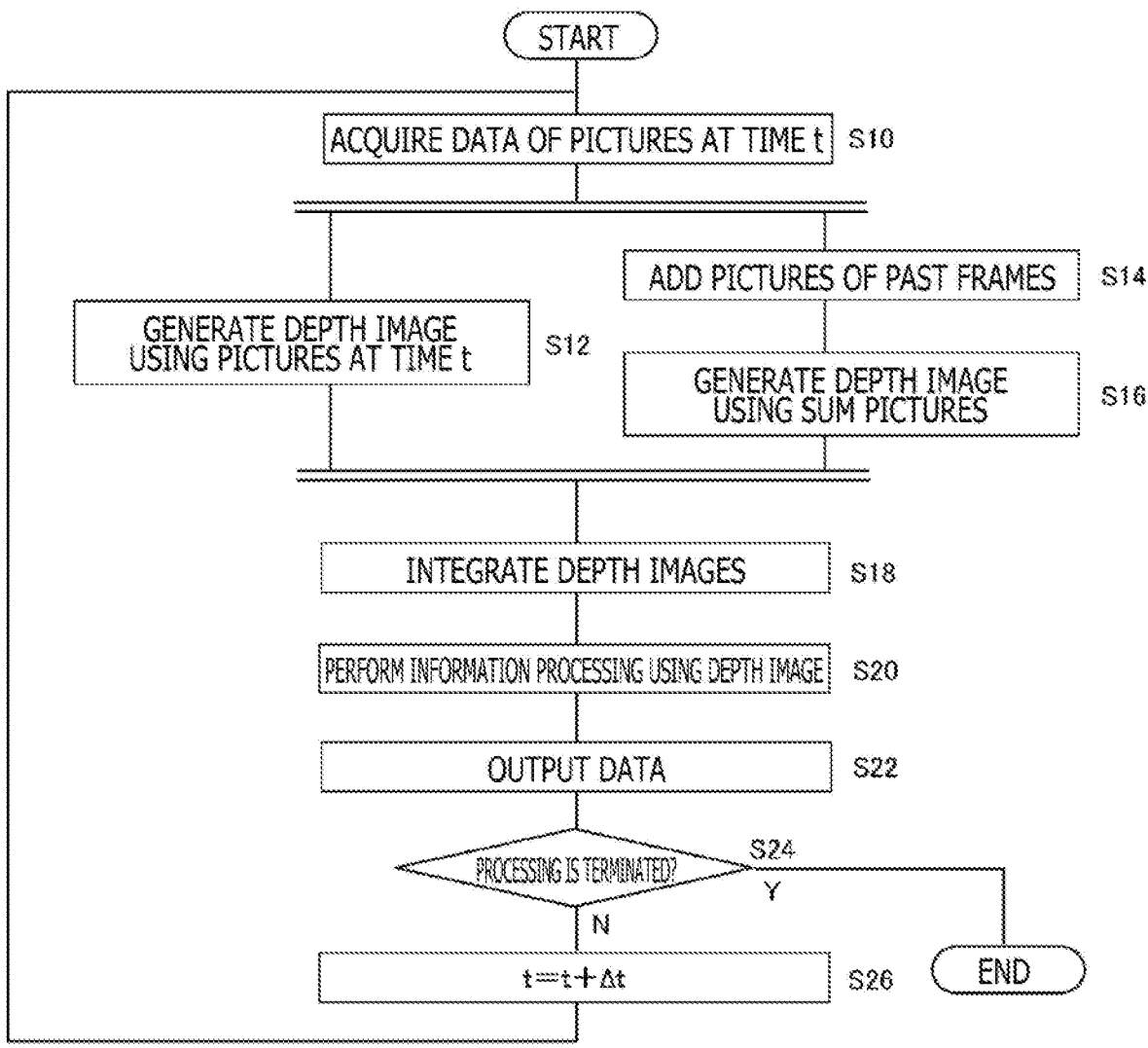
FIG. 8 is a flowchart illustrating a processing procedure in which the information processing device acquires position information using the photographed pictures, and performs data output, according to the first embodiment.

Next, an operation of the information processing device according to the present embodiment, which is implemented by the above-described configuration, will now be described below. FIG. 8 is a flowchart illustrating a processing procedure in which the information processing device 10 acquires the position information using the photographed pictures, and performs data output. This flowchart illustrates an operation of the information processing device 10 in a situation in which an electronic content that requires the position information of a subject has been selected by the user, and photographing is being performed by the imaging device 12. At this time, an initial picture may be displayed on the display device 16 as necessary.

First, the picture data acquisition unit 52 of the information processing device 10 acquires stereo picture data of a frame at a current time t from the imaging device 12, and stores the acquired stereo picture data in the picture data storage unit 54 (S10). As mentioned above, in the case where the position information is acquired from the stereo pictures obtained by detecting the particular wavelength range, data of color pictures may be additionally acquired. The position information acquisition unit 58 reads the stereo pictures of the frame at this time t from the picture data storage unit 54, and generates the depth image by detecting the corresponding points therein and obtaining the distance values of any subject (S12).

Meanwhile, the picture adding unit 56 reads data of stereo pictures of the predetermined number of past frames acquired immediately before the current frame from the picture data storage unit 54, and generates data of the sum stereo pictures by adding the pixel values of pixels at corresponding positions together using the pictures of the current frame as well (S14). Naturally, this process is started from a time point at which the pictures of the predetermined number of past frames have been stored in the picture data storage unit 54. An optimum number of past frames to be added is determined in advance logically or by an experiment or the like. For example, the range of brightnesses that can be obtained in the stereo pictures can be identified from a combination of the range of distances that a subject can be expected to have and the range of intensities that the emitted light or the ambient light can be expected to have.

A brightness value in the vicinity of the lowest value of the above range of brightnesses is determined to be a value sufficient for the detection of the corresponding points, and the appropriate number of frames to be added together can be determined by calculating a rate that can provide values well below an upper-limit value that is permitted in a corresponding point acquiring process. Typically, the brightness range is increased by a factor of four by addition of three past frames, and levels of brightness are increased by two bits. A plurality of types of the number of frames to be added together, e.g., 2, 4, 8, etc., may be provided, and the processes of S14 and S16 may be performed with each type of the number of frames to be added together.

As illustrated in the sum stereo pictures 84a and 84b in FIG. 6, an image for which a sufficient brightness is originally obtained may exceed an upper limit permitted for computation as a result of the addition. Accordingly, the upper-limit value of the brightness is set in advance, and if a result of the addition exceeds the upper-limit value, the picture adding unit 56 replaces the brightness obtained with the upper-limit value. Thus, the present embodiment can be easily introduced without the need to change a computation program involved in the detection of the corresponding points. The position information acquisition unit 58 acquires the stereo pictures obtained by the addition of the past frame from the picture adding unit 56, and generates the depth image based on the sum pictures by detecting the corresponding points therein and obtaining the distance values of any subject (S16).

Next, the position information acquisition unit 58 integrates the depth image based on the pictures of the current frame generated at S12 with the depth image based on the sum pictures to generate a single depth image that can cover a variety of conditions of subjects (S18). The information processing unit 60 performs the predetermined information processing using this depth image (S20). As mentioned above, the content of the information processing is not limited to particular contents, and may vary depending on, for example, an application selected by the user. The information processing unit 60 generates the output data, such as the display pictures, audios, and/or the like, as a result of the information processing, and the output unit 62 outputs the output data to the display device 16 or the like, so that output corresponding to the situation of the real space at time t can be performed (S22).

While a progress in a game, a user operation, or the like does not produce a need to terminate the processing (N at S24), picture data of a frame at a next time, t=t+Δt, is acquired (S26 and S10), and the processes of S12 to S22 are repeated. If a need to terminate the processing arises, all the processes are terminated (Y at S24).

According to the present embodiment described above, in a technique of detecting the feature points by analyzing the photographed pictures to acquire the position information of a subject, the pictures of the predetermined number of past frames obtained by photographing immediately before the current frame are added before performing an analysis. Thus, the brightness range of a pixel that has a very low brightness and which cannot be easily detected as a feature point can be amplified, and a relative noise level reduction can be achieved. As a result, the images of reflected lights and the feature points can be detected with improved precision, and, in turn, the position information can be obtained with accuracy.

In addition, a processing channel along which an analysis is performed without the addition of a past frame is provided to cope with a case where appropriate brightness is originally obtained. Further, processing channels along which image analyses are performed with different numbers of past frames to be added may be provided. One or a combination of the above ensures sufficient precision in the detection of the images of reflected lights and the feature points in the original photographed pictures regardless of brightness levels thereof. As a result, the positions of subjects that may be distributed over a wide distance range can be acquired with high accuracy without the need to adjust the intensity of the emitted light or the photographing conditions.

In addition, a plurality of pieces of position information acquired along different ones of the processing channels are integrated to generate a single depth image. Thus, even when subjects that are significantly different in distance and/or condition coexist in the same field of view, the position information generated in the end will be even in accuracy, eliminating the need to take unevenness in accuracy into account in the information processing that employs the position information. As a result, sufficient accuracy in the information processing can be easily maintained regardless of the conditions of the subjects.

Second Embodiment

In the first embodiment, the photographed pictures are used as objects from which the feature points are extracted, and the addition of a past frame is performed with an improvement in extraction precision as a main purpose. In the present embodiment, in a mode in which a photographed picture is displayed as it is or after being processed, addition of a picture is performed for the purpose of extending the brightness range of a display picture.

At this time, the addition may be performed after an image in a past frame is corrected with a movement of an imaging surface or a movement of a subject being taken into account to generate an image at a time of a current frame, with the view of making an image in a sum picture clearer. Note that the configuration of an information processing system according to the present embodiment and the internal circuit configuration of an information processing device according to the present embodiment may be similar to those described above with respect to the first embodiment. Also note that an imaging device 12 and a display device 16 may be formed by a head-mounted display 100 as illustrated in FIG. 2.

Figure 9:
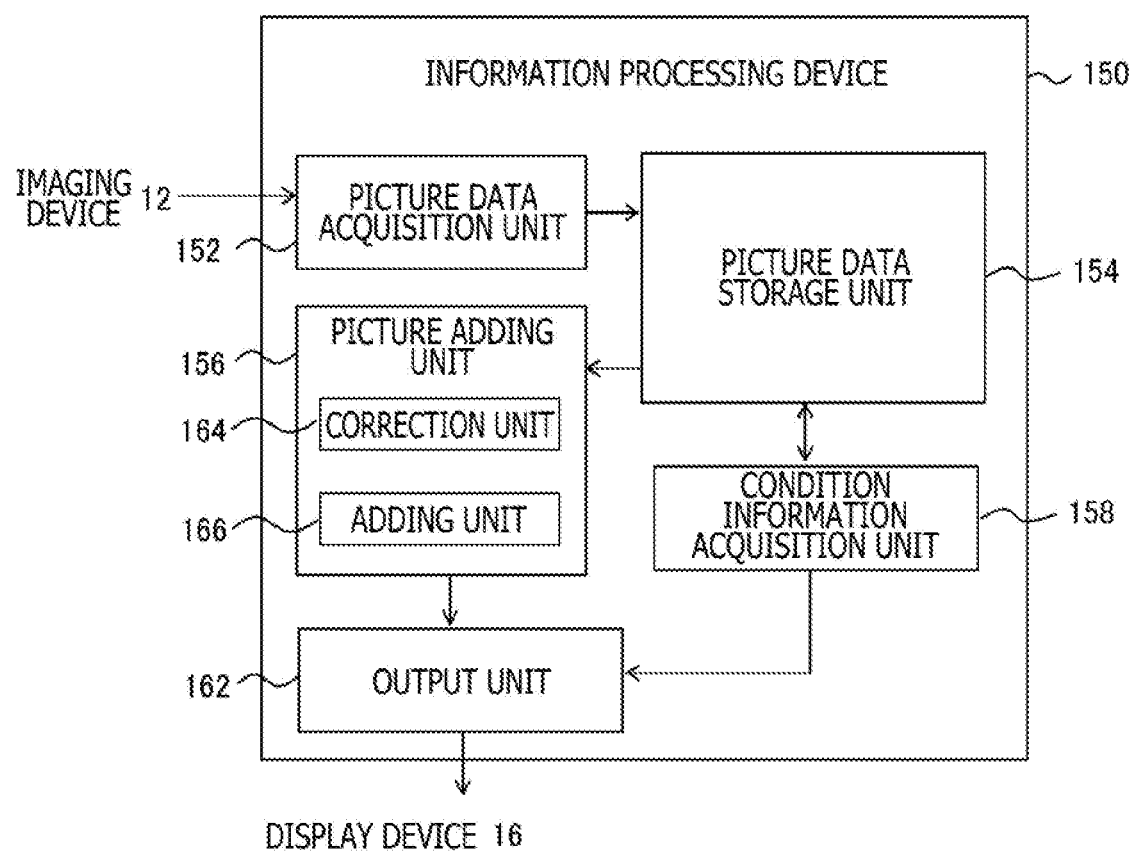
FIG. 9 is a diagram illustrating the configuration of functional blocks of an information processing device according to a second embodiment.

FIG. 9 illustrates the configuration of functional blocks of the information processing device according to the present embodiment. The information processing device 150 includes a picture data acquisition unit 152 that acquires data of pictures from the imaging device 12, a picture data storage unit 154 that stores the acquired data of the pictures, a picture adding unit 156 that performs an addition of pictures of a predetermined number of past frames, a condition information acquisition unit 158 that acquires information about the condition of a subject, and an output unit 62 that outputs data to be outputted.

The picture data acquisition unit 152 has a function similar to that of the picture data acquisition unit 52 according to the first embodiment. Note, however, that it may be sufficient if the picture data acquisition unit 152 according to the present embodiment is configured to acquire at least data used for a display picture. The picture data acquisition unit 152 further acquires data for obtaining changes in posture and position of a subject relative to the imaging surface with the data being associated with a photographed picture. For example, in the case where the head-mounted display 100 as illustrated in FIG. 2 is introduced, and a display is performed using a picture taken with the camera provided on the front of the housing 108, a measured value may be acquired from a motion sensor, such as a gyro sensor, an acceleration sensor, or the like, contained in the head-mounted display 100 to obtain a movement of a head of a user.

This will make it possible to identify a movement of a subject relative to a plane of the photographed picture, and thus will make it possible to correct an image of the subject pictured in a picture of a past frame to an image at the same time as that of the current frame. Note that the data referred to for identifying the movement of the subject relative to the plane of the photographed picture is not limited to the measured value acquired from the motion sensor, and that the imaging device 12 and the display device 16 according to the present embodiment may not necessarily be formed by the head-mounted display 100.

For example, in the case where a subject has a known shape and size, the position and posture thereof in a real space can be obtained using a photographed picture through matching with a template image or an object model. Various other techniques have been proposed for tracking or estimating changes in the position and posture of a subject in a real space using photographed pictures, and any of such techniques may be adopted.

The picture data acquisition unit 152 causes the data of the pictures sent at a predetermined frame rate to be sequentially stored in the picture data storage unit 154. Picture data of the current frame and the predetermined number of past frames are stored in the picture data storage unit 154. In the case where the measured values are acquired from the motion sensor in the head-mounted display 100, the picture data acquisition unit 152 causes data of the measured values as well to be sequentially stored in the picture data storage unit 154 so as to be associated with photographed pictures at corresponding times.

The condition information acquisition unit 158 is implemented by the CPU 23, the GPU 24, the main memory 26, and so on illustrated in FIG. 3, and sequentially reads the data of the photographed pictures or the measured values of the motion sensor stored in the picture data storage unit 154, and acquires the position and posture of a subject in a three-dimensional real space at each time as mentioned above. Pieces of information thus acquired are sequentially stored in the picture data storage unit 154 so as to be associated with the photographed pictures at corresponding times. The picture adding unit 156 is implemented by the CPU 23, the GPU 24, the main memory 26, and so on illustrated in FIG. 3, and includes a correction unit 164 and an adding unit 166.

The correction unit 164 acquires, with respect to each subject, angles of rotation and an amount of translation that have occurred from a past frame to the current frame on the basis of the information of the position and posture of the subject in each frame acquired by the condition information acquisition unit 158. Then, the position and posture of the subject are virtually manipulated in a three-dimensional space to obtain an image of the subject in the picture of the past frame as moved to the time of the current frame.

The adding unit 166 adds pictures of the past frame thus corrected to the picture of the current frame to generate a sum picture used for display. The number of frames to be added is determined on the basis of the brightness range of the original photographed picture and a brightness range supported by the display device 16 or a brightness range desired for image representation. The number of frames to be added may be adaptively determined in accordance with the display device 16 being connected.

The output unit 162 is formed by the CPU 23, the output unit 36, and so on illustrated in FIG. 3, and sequentially outputs data of the sum pictures generated by the picture adding unit 156 to the display device 16 with appropriate timing. The output unit 162 may output the data after performing a predetermined process, such as, for example, rendering a virtual object on the sum picture. In this process, the information about the position and posture of the subject acquired by the condition information acquisition unit 158 may be utilized. Further, the output unit 162 may output audio data as well.

Figure 10:
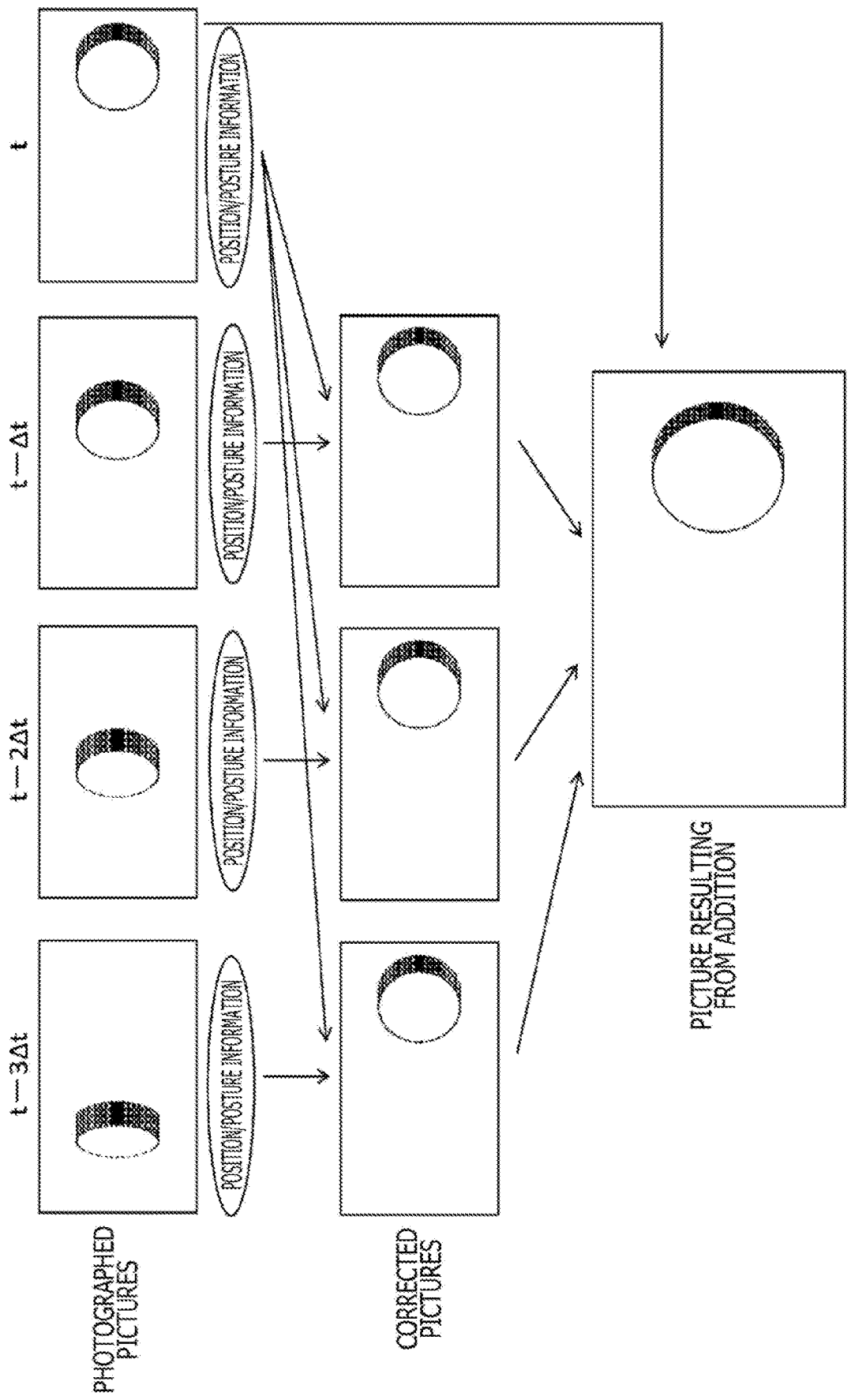
FIG. 10 is a diagram schematically illustrating how a picture adding unit according to the second embodiment adds, to a picture of a current frame, pictures of past frames after correcting the pictures of the past frames.

FIG. 10 schematically illustrates how the picture adding unit 156 according to the present embodiment adds, to the picture of the current frame, pictures of past frames after correcting the pictures of the past frames. In a top row of this figure, contents of photographed pictures of four frames to be added together and photographing times of the respective frames are illustrated, with Δt denoting a time interval of photographing of the frames and t denoting the photographing time of the current frame. In the example of this figure, a side surface of a disk-shaped object, which is a subject, can be seen at time t-3Δt, and the condition of the disk-shaped object changes in such a manner that an upper surface of the disk gradually becomes more apparent as time passes therefrom to times t-2Δt, t-Δt, and t. In addition, this subject is moving from left to right in a field of view.

At this time, the condition information acquisition unit 158 acquires information about the position and posture of the subject at each time in the three-dimensional space, or amounts of change therein, as illustrated below each photographed picture. The correction unit 164 corrects an image of the subject in each past frame to an image at the time of the current frame on the basis of differences in the position and posture between the past frame and the current frame, i.e., the amount of translation and the angle of rotation about each of three axes. On the assumption that the angles of rotation of the subject are represented by roll $\varphi$, pitch $\theta$, and yaw $\psi$ and the amount of translation thereof is represented by $(T_x, T_y, T_z)$, a point on a surface of the subject at position coordinates (x, y, z) in the three-dimensional space is moved by the equation below to position coordinates (x', y', z') after the rotation and translation.

$$\begin{pmatrix} x' \\ y' \\ z' \\ 1 \end{pmatrix} = \begin{pmatrix} \cos\varphi\cos\theta & \begin{matrix}\cos\varphi\sin\theta\sin\psi - \\ \sin\varphi\cos\psi\end{matrix} & \begin{matrix}\cos\varphi\sin\theta\cos\psi + \\ \sin\varphi\sin\psi\end{matrix} & T_x \\ \sin\varphi\cos\theta & \begin{matrix}\sin\varphi\sin\theta\sin\psi + \\ \cos\varphi\cos\psi\end{matrix} & \begin{matrix}\sin\varphi\sin\theta\cos\psi - \\ \cos\varphi\sin\psi\end{matrix} & T_y \\ -\sin\theta & \cos\theta\sin\psi & \cos\theta\cos\psi & T_z \\ 0 & 0 & 0 & 1 \end{pmatrix} \begin{pmatrix} x \\ y \\ z \\ 1 \end{pmatrix} \quad [\text{Math. 1}]$$

A destination of the pixel in the original photographed picture can be obtained by projecting the position coordinates (x', y', z') obtained by the above equation onto a picture plane through perspective transformation. As illustrated in a middle row of this figure, an image at the time t of the current frame can be generated from the image of the subject in each of the frames at times t-3Δt, t-2Δt, and t-Δt by performing the above correction process with respect to all pixels that form the subject. The adding unit 166 is able to generate a picture resulting from the addition as illustrated in a bottom row of this figure by adding pictures in which the images in the past frames at times t-3Δt, t-2Δt, and t-Δt have been corrected and the photographed picture of the current frame at time t together. The color depth of the generated picture is greater than that of the original photographed picture by two bits. Therefore, more dynamic image representation will be possible with displaying using the display device 16 supporting the above.

Figure 11:
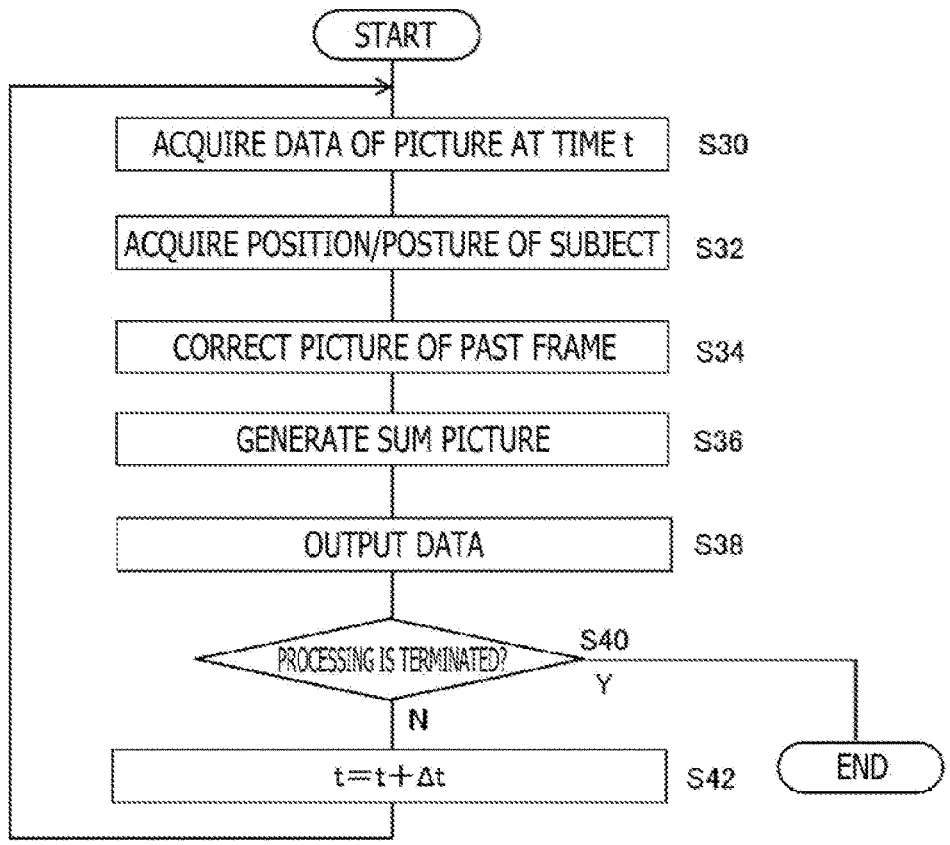
FIG. 11 is a flowchart illustrating a processing procedure in which the information processing device according to the second embodiment performs displaying while extending the brightness range of a photographed picture.

Next, an operation of the information processing device according to the present embodiment, which is implemented by the above-described configuration, will now be described below. FIG. 11 is a flowchart illustrating a processing procedure in which the information processing device 150 performs displaying while extending the brightness range of the photographed picture. This flowchart illustrates an operation of the information processing device 150 in a situation in which an electronic content that involves displaying of the photographed picture has been selected by the user, and photographing is being performed by the imaging device 12. At this time, an initial picture may be displayed on the display device 16 as necessary.

First, the picture data acquisition unit 152 of the information processing device 150 acquires data of the photographed picture of the frame at the current time t from the imaging device 12, and stores the acquired data in the picture data storage unit 54 (S30). At this time, depending on the mode, measured values about the position and posture of the head of the user may be acquired from the motion sensor in the head-mounted display 100, which involves the imaging device 12, and be stored in the picture data storage unit 54 so as to be associated with the data of the photographed picture.

The condition information acquisition unit 158 acquires the position and posture of any subject depicted in the frame at the current time t (S32). The purpose of the acquisition of the above information is to correct an image in the picture plane as illustrated in FIG. 10, and therefore, the condition information acquisition unit 158 acquires information that makes it possible to derive relative positional and angular relationships between the imaging surface and the subject. As far as this can be accomplished, the above information may represent either positions and postures of a screen and the subject in a world coordinate system, or a position and a posture of the subject in a camera coordinate system.

As described above, the above information may be acquired either from the measured values obtained by the motion sensor in the head-mounted display 100, or on the basis of the shape and size of the image of the subject pictured in the photographed picture. Data of stereo pictures may be acquired from the imaging device 12, and the position of the subject in the three-dimensional space may be identified on the basis of this data. In this case, as described above with respect to the first embodiment, corresponding points may be detected using the pictures obtained by the addition of the photographed picture of the past frame. The information based on the motion sensor and the information based on the photographed pictures may be integrated to obtain final information about the position and posture.

The information acquired is stored in the picture data storage unit 154 so as to be associated with the data of the photographed picture of the frame at time t. Next, the correction unit 164 of the picture adding unit 156 reads, from the picture data storage unit 54, data of the photographed picture of the predetermined number of past frames acquired immediately before the current frame, and a piece of information about the position and posture of the subject associated therewith, and generates a picture in which the image of the subject has been corrected to an image at the current time t (S34).

Specifically, position coordinates of a destination of each of the pixels that form the subject are obtained through the above equation and perspective transformation from the angles of rotation and the amount of translation of the subject that have occurred from the photographing time of the past frame, t-nΔt (1≤n≤N, where N is the number of past frames to be added), to the photographing time of the current frame, t. Then, the image after the correction is formed by moving the pixels of the image before the correction. Note that, in the case where an error rate seems to be high compared to the amount of translation of an object that has occurred during several frames, elements of the amount of translation in the above equation, $(T_x, T_y, T_z)$, may not be included in the computation.

Further, the correction unit 164 may perform an additional correcting process to achieve an additional improvement in picture quality. Specifically, pixel interpolation may be performed on the pictures of the past frames and the current frame using a known technique to achieve an increase in resolution. Further, any of various types of compensation filters, e.g., a noise removal filter, etc., may be applied. The adding unit 166 generates the sum picture by adding the picture thus corrected to the picture of the current frame such that pixels at corresponding positions are added together (S36). Here, as described below, areas of the pixels to be added together may be displaced from each other on a sub-pixel basis to realize a high-definition and high-resolution sum picture.

Note that, as in the first embodiment, if the brightness value of any pixel has exceeded a predetermined upper-limit value as a result of the addition, the pixel value thereof is replaced with the upper-limit value. The output unit 162 outputs data of the generated sum picture to the display device 16 or the like (S38). Thus, a display picture at time t is displayed with high definition. The output unit 162 may also output audio data as appropriate. Further, as mentioned above, the output unit 162 may perform a predetermined process on the sum picture.

While a progress in a game, a user operation, or the like does not produce a need to terminate the processing (N at S40), data of a photographed picture of a frame at a next time, t=t+Δt, is acquired (S42 and S30), and the processes of S32 to S38 are repeated. If a need to terminate the processing arises, all the processes are terminated (Y at S40).

Figure 12:
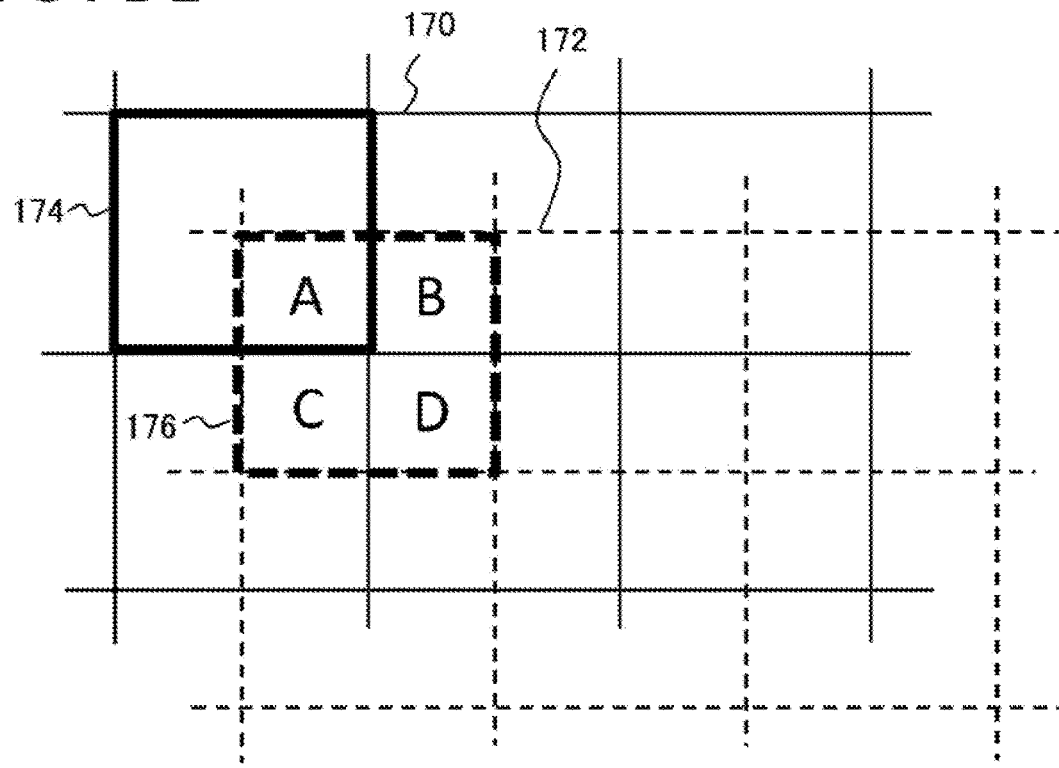
FIG. 12 is a diagram schematically illustrating how an adding unit according to the second embodiment performs picture addition with displacing of pixel areas.

FIG. 12 schematically illustrates how, at S36 in FIG. 11, the adding unit 166 performs the picture addition with displacing of pixel areas. This example illustrates a displacement of two rows and three columns of pixels when two pictures 170 and 172 are added together, and boundary lines of the pixels of the picture 170 are represented by solid lines, while boundary lines of the pixels of the picture 172 are represented by broken lines. For example, a pixel 174 in the picture 170 corresponds to a pixel 176 in the picture 172. When the boundaries of the pixels are displaced by a half pixel both vertically and horizontally as illustrated in the figure, each pixel area of one of the pictures is divided into four parts by boundaries of pixel areas of the other picture.

For example, the pixel 176 is divided into four areas "A," "B," "C," and "D." To the area "A," a pixel value of the pixel 174 in the other picture 170 is added. To each of the other areas, a pixel value of another pixel adjacent to the pixel 174 in the picture 170 is added. As a result, a picture obtained by adding together of the two pictures will have a resolution four times that of the original pictures. This process is able to generate a high-resolution picture with a higher precision than can be achieved by linear interpolation between pixels.

In the illustrated example, the displacement is performed by the same amount both vertically and horizontally. However, in the present embodiment, the angles of rotation and the amount of translation of the subject are obtained, and accordingly, the displacement may be performed by different amounts in different directions. For example, the displacement may be performed by a greater amount in a direction in which pixels are moved by a greater distance by the correction. Further, in the case where pictures of three or more frames are added together, in particular, the displacement may not necessarily be performed by a half pixel, but may alternatively be performed on a smaller basis. In short, rules may be set in advance to make it possible to derive a combination of a direction and an amount in or by which each picture is to be displaced at the time of the addition, from the number of frames to be added together, the position and posture of a subject, and/or the like.

According to the present embodiment described above, in a technique of performing a display using a photographed picture, pictures of the predetermined number of past frames obtained by photographing immediately before the current frame are added to generate a display picture. Thus, the brightness of an image of a subject can be controlled without an amplification of noise, and a more expressive, high-definition picture can be displayed in accordance with the brightness range supported by the display device.

Further, the position and posture of the subject in the three-dimensional space at each time are acquired in advance, and an image in the picture of each past frame before the addition is corrected so as to match the time of the current frame. Thus, even when a movement of the imaging surface or the subject has occurred since the past frame due to passage of time, a clear picture can be displayed without being affected by the minute movement. This makes it possible to flexibly set the number of past frames to be added to easily accomplish a conversion to a desired brightness range, while minimizing an influence on the display picture.

Note that the picture adding unit 56 according to the first embodiment may be configured to have a function of the correction unit 164 according to the present embodiment. In this case, the condition information acquisition unit 158, which acquires the angles of rotation and the amount of translation of the subject in the three-dimensional space on the basis of the measured values obtained by the motion sensor or the like, may be further included in the information processing device 10, or alternatively, it may be so arranged that the above process is performed by the image analysis unit 58, and a result thereof is supplied to the picture adding unit 56. Thus, the sum pictures can be generated with even a minute movement of a subject being taken into account, and the detection of the feature points and hence the acquisition of the position information can be achieved with higher precision. Further, an increase in flexibility as to the number of past frames to be added can be achieved, enabling feature points of subjects in a greater variety of conditions to be acquired accurately.

In the foregoing, the present invention has been described with reference to embodiments thereof. It should be understood by those skilled in the art that the above embodiments have been described by way of example only, and that various modifications are possible with respect to combinations of components and processes thereof, and such modifications also fall within the scope of the present invention.

For example, in the first embodiment, the image analysis unit 58 acquires the position information independently along each of the processing channel in which the addition of the photographed picture is not performed and the processing channel in which the addition of the photographed picture is performed, and integrates the results thereof. Meanwhile, the image analysis unit 58 may be configured to acquire the position information in each of separate processing channels which are provided from another viewpoint as well, and integrate results thereof. For example, a channel along which color stereo pictures taken with ambient light are used to acquire the position information, and a channel along which stereo pictures taken with light in a particular wavelength range are used to acquire the position information, may be provided.

In addition, in each processing channel, separate processing channels which are different in whether the addition of a photographed picture is performed or in the number of photographed pictures to be added may be further provided. An increase in the number of processing channels will enable the detection of the feature points and the acquisition of the position information to be performed with higher robustness for a change in the condition of a subject. The setting of the processing channels is determined as appropriate in accordance with the precision or time resolution demanded of the information to be acquired, the processing performance of the information processing device, a communication band permitted for use, and/or the like.

REFERENCE SIGNS LIST

1 Information processing system, 10 Information processing device, 12 Imaging device, 16 Display device, 52 Picture data acquisition unit, 54 Picture data storage unit, 56 Picture adding unit, 58 Image analysis unit, 60 Information processing unit, 62 Output unit, 152 Picture data acquisition unit, 154 Picture data storage unit, 156 Picture adding unit, 158 Condition information acquisition unit, 162 Output unit, 164 Correction unit, 166 Adding unit.

INDUSTRIAL APPLICABILITY

As will be apparent from the foregoing description, the present invention is applicable to, for example, various types of information processing devices, such as a game device, an image processing device, a portable terminal, and an electronic content processing device, and to information processing systems including such an information processing device.

The invention claimed is:

1. An information processing device comprising:
    a picture data acquisition unit configured to sequentially acquire picture data of frames of a moving picture obtained by photographing;
    a picture adding unit configured to generate a sum picture obtained by adding, to pixel values of a picture of a current frame newly acquired, pixel values of a picture of a past frame acquired earner, the pixel values added together being those of pixels at corresponding positions;
    an output unit configured to output data representing a result of a predetermined process performed using the sum picture; and
    an image analysis unit configured to perform an analysis process by extracting a feature point from the sum picture, and acquire information about a subject, wherein the output unit outputs data representing a result of information processing performed on a basis of the information about the subject, and wherein the image analysis unit performs an analysis process on a basis of the feature point extracted from the sum picture, performs an analysis process by extracting a feature point from the picture of the current frame, and integrates results of both.

2. The information processing device according to claim 1, wherein
    the picture adding unit generates a plurality of the sum pictures, each sum picture being generated with addition of a different number of past frames; and
    the image analysis unit performs an analysis process on the basis of the feature point extracted from each of the plurality of sum pictures.

3. The information processing device according to claim 1, wherein
    the picture adding unit, before performing the addition, corrects an image of a subject in the picture of the past frame to an image at a photographing time of the current frame on a basis of changes in position and posture of the subject in a three-dimensional space.

4. The information processing device according to claim 1, wherein the output unit outputs data of display picture including the sum picture.

5. The information processing device according to claim 4, wherein
the picture adding unit associates the frames to be added together with each other with a displacement therebetween on a smaller basis than that of an area of one pixel to generate areas obtained as a result of dividing pixel areas of one of the frames by pixel boundaries of another one of the frames, and adds the pixel values together on a basis of the areas obtained as a result of the division.

6. The information processing device according to claim 5, wherein
the picture adding unit determines a direction in which the frames to be added together are displaced from each other on a basis of changes in position and posture of a subject in a three-dimensional space.

7. The information processing device according to claim 1, wherein the picture adding unit selects a number of past frames to be added so as to avow an image of a subject in the sum picture to be given in a predetermined brightness range.

8. The information processing device according to claim 1, wherein the picture data acquisition unit acquires picture data of frames obtained by video shooting of reflected light of light in a predetermined wavelength range emitted to a space to be photographed; and the image analysis unit extracts, from the sum picture, an image of the reflected light as the feature point.

9. An information processing system comprising:
a head-mounted display including an imaging device configured to take a moving picture with a field of view corresponding to a gaze of a user; and
an information processing device configured to generate data of display pictures to be displayed by the head-mounted display on a basis of the moving picture, wherein the information processing device includes:
a picture data acquisition unit configured to sequentially acquire picture data of frames of the moving picture;
a picture adding unit configured to generate a sum picture obtained by adding, to pixel values of a picture of a current frame newly acquired, pixel values of a picture of past frame acquired earner, the pixel values added together being those of pixels at corresponding positions; and
an output unit configured to output the data of the display pictures, the data representing a result of a predetermined process performed using the sum picture, wherein the output unit outputs data of display picture including the sum picture, and wherein the picture adding unit associates the frames to be added together with each other with a displacement therebetween on a smaller basis than that of an area of one pixel to generate areas obtained as a result of dividing pixel areas of one of the frames by pixel boundaries of another one of the frames, and adds the pixel values together on a basis of the areas obtained as a result of the division.

10. An image processing method to be employed by an information processing device, the method comprising:
sequentially acquiring picture data of frames of a moving picture obtained by photographing, and storing the picture data in a memory;
generating a sum picture obtained by adding, to pixel values of a picture of a current frame newly acquired, pixel values of a picture of a past frame acquired earlier and read from the memory, the pixel values added together being those of pixels at corresponding positions;
outputting data representing a result of a predetermined process performed using the sum picture, performing an analysis process by extracting a feature point from the sum picture and acquiring information about a subject;
outputting data representing a result of information processing performed on a basis of the information about the subject;
performing an analysis process on a basis of the feature point extracted from the sum picture; and
performing an analysis process by extracting a feature point from the picture of the current frame and integrating results of both.

11. A non-transitory computer readable medium having stored thereon a computer program for a computer, comprising:
by a picture data acquisition unit, sequentially acquiring picture data of frames of a moving picture obtained by photographing;
by a picture adding unit, generating a sum picture obtained by adding, to pixel values of a picture of a current frame newly acquired, pixel values of a picture of a past frame acquired earlier, the pixel values added together being those of pixels at corresponding positions; and
by an output unit, outputting data representing a result of a predetermined process performed using the sum picture,
wherein the output unit outputs data of display picture including the sum picture, and
wherein the picture adding unit associates the frames to be added together with each other with a displacement therebetween on a smaller basis than that of an area of one pixel to generate areas obtained as a result of dividing pixel areas of one of the frames by pixel boundaries of another one of the frames, and adds the pixel values together on a basis of the areas obtained as a result of the division.

* * * * *